United States Patent [19]

Hinckley

[11] Patent Number: 4,719,553

[45] Date of Patent: Jan. 12, 1988

[54] INRUSH-CURRENT LIMITER FOR SWITCHING REGULATOR POWER SUPPLY

[75] Inventor: Paul Hinckley, Hicksville, N.Y.

[73] Assignee: Unisys Corporation, Blue Bell, Pa.

[21] Appl. No.: 46,760

[22] Filed: May 7, 1987

[51] Int. Cl.⁴ .................... H02M 1/15; H02M 7/06
[52] U.S. Cl. ................................ 363/49; 323/901; 363/89
[58] Field of Search .................. 363/47, 48, 49, 89, 363/53; 323/266, 901

[56] References Cited

U.S. PATENT DOCUMENTS 4,271,460  6/1981  Baker ..................... 363/49
4,307,440  12/1981  Inoue et al. ............. 323/266

FOREIGN PATENT DOCUMENTS 94969   7/1981  Japan .................... 363/49
862333  9/1981  U.S.S.R. ................ 363/49

Primary Examiner—William H. Beha, Jr.
Attorney, Agent, or Firm—A. B. Cooper; A. L. Albin

[57] ABSTRACT

A DC voltage power supply circuit for suppressing turn-on transients applied to a switching voltage regulator circuit includes a relatively high impedance current suppression element connected in series between a rectifier circuit and a capacitive load, means for sensing a voltage drop developed across the suppression element, a diode network for developing a reference potential, and a silicon-controlled rectifier having a gate electrode responsive to the voltage drop developed across the current suppression element and the reference potential developed across the diode, for energizing a relay having contacts for disabling the switching regulator from supplying the load during the initial turn-on phase, and for shunting the current suppression element and activating the switching regulator after the capacitive load is substantially charged.

14 Claims, 3 Drawing Figures

INRUSH-CURRENT LIMITER FOR SWITCHING REGULATOR POWER SUPPLY

The U.S. government has rights in this invention under Department of the Navy contract No. N00024-84-C-4003.

BACKGROUND OF THE INVENTION

1. Field of the Invention

The invention relates generally to power supply circuits and more particularly to circuitry for limiting inrush current transients associated with initial turn-on of a switching regulator type power supply.

2. Description of the Prior Arts

Inrush current transients in power supply circuits are generally caused by charging of substantially uncharged capacitive loads upon the initial application of a voltage to the circuit. This period is referred to as circuit turn-on. The transients may be attributed to the charging of the large value storage capacitors typically connected across the output terminals of a rectifier to filter the rectified unregulated voltage. The inrush surge current is limited only by the impedances of the power transformer, rectifying diodes, and series inductance. Since these impedances are usually very low, a turn-on current as high as ten times the steady-state current may be drawn by the power supply. This inrush surge may cause an undesired voltage drop on the AC power lines.

Techniques presently utilized to limit current transients occuring at the initial application of power to a switching regulator include the placement of a large inductor at the input to the regulator to limit the rate of rise of the input current. Conventionally, a large value of series inductance will provide the requisite impedance to suppress turn-on current transients. A large inductance appears as an open circuit through a suddenly applied voltage, thereby providing a large series impedance to current transients caused by the initial application of the input voltage to the uncharged input filter capacitor. However, a serious disadvantage of a large input inductor is the size and weight to provide sufficient impedance to suppress the inrush current. Further, the energy stored in such an inductor must be dissipated when the switching regulator cycle is turned off to prevent large voltage transients. This requires damper resistors or diodes which complicate the necessary circuitry and increase cost. Therefore, it is advantageous to provide current transient suppression only for the duration of turn-on or the initial current surge, and thereafter to disable the suppression from the rest of the circuitry for circuit operation subsequent to turn-on, as when all capacitive elements have been substantially charged to their full capacity.

An improved prior art technique is shown in FIG. 1. Here a resistor R1 is placed in series with an inductor L1 and a series regulator 10. The coil of a relay K1 is placed in parallel with the load capacitor C1. Contacts X1 of the relay shunt resistor R1. When power switch S1 is closed, applying AC power through transformer windings T1-T3 and diode rectifiers CR1-CR6, inductor L1 and resistor R1 limit the charging current applied to capacitor C1. The voltage across capacitor C1 increases exponentially in accordance with the RLC time constant. When the voltage across capacitor C1 is sufficiently high, the coil of relay K1 will activate contacts X1. Normally open contacts X1 will be closed, thereby short-circuiting resistor R1 and restoring the circuit to full voltage operation. This circuit has the disadvantage, however, that due to the resistance of the series dropping resistor R1, C1 will not be fully charged at the time that relay K1 closes. As a result, when the normally open contacts X1 bypass resistor R1, there is a secondary surge while capacitor C1 charges up to a higher voltage value. This secondary surge can be greater than the initial inrush current transient.

U.S. Pat. No. 4,271,460 discloses a solid-state circuit for switching inrush current impedance into and out of the circuit. This disclosure teaches a suppression impedance of relatively high value connected between a DC supply and a load, a transistorized control circuit for sensing the voltage developed across the load, a firing signal when the voltage exceeds a predetermined potential, and a silicon controlled rectifier (SCR) having its main current path connected in parallel with the suppression impedance, the gate electrode of the silicon controlled rectifier coupled to receive the firing signal for turning on the silicon controlled rectifier so as to bypass the suppression impedance subsequent to application of power to the load. The disadvantage of such a circuit is that if the reference voltage is relatively high with respect to the output voltage of the circuit, there may be a substantial secondary surge, as in the relay circuit of FIG. 1. Further, for relatively low voltage power converters, the voltage drop across the series connected transistor control circuit may be excessive, causing substantial power losses. Moreover, the circuit relies on the series inductance for suppressing the secondary current surge and completing the charging of the load capacitor.

SUMMARY OF THE INVENTION

The present invention provides a power supply circuit for suppressing turn-on transients to limit inrush current when power is applied to a substantially uncharged capacitive load. An impedance is provided in series with the DC voltage supply and the capacitive load for limiting current surges during the initial application of power. When power is applied to the capacitive load a voltage drop is developed across the suppression impedance and applied to a control circuit as the capacitor charges. When the voltage drop has reached a predetermined value with respect to a reference potential, a relay is activated that shunts the suppression impedance, thereby allowing the full DC power supply input to be applied to the capacitive load.

Operation of the regulator circuit is inhibited until the capacitor is fully charged. The control circuit applies an appropriate signal for inhibiting operation of the regulator during the charging of the capacitor. Upon initial application of DC power, the switching regulator is disabled so that current drawn by the regulator will not inhibit the circuit from triggering the relay. When the capacitor has charged to its full value, the switching regulator is activated by the control signal.

BRIEF DESCRIPTION OF THE DRAWINGS

In the drawings, where like elements have the same reference designation.

DESCRIPTION OF THE PREFERRED EMBODIMENT

Figure 1:
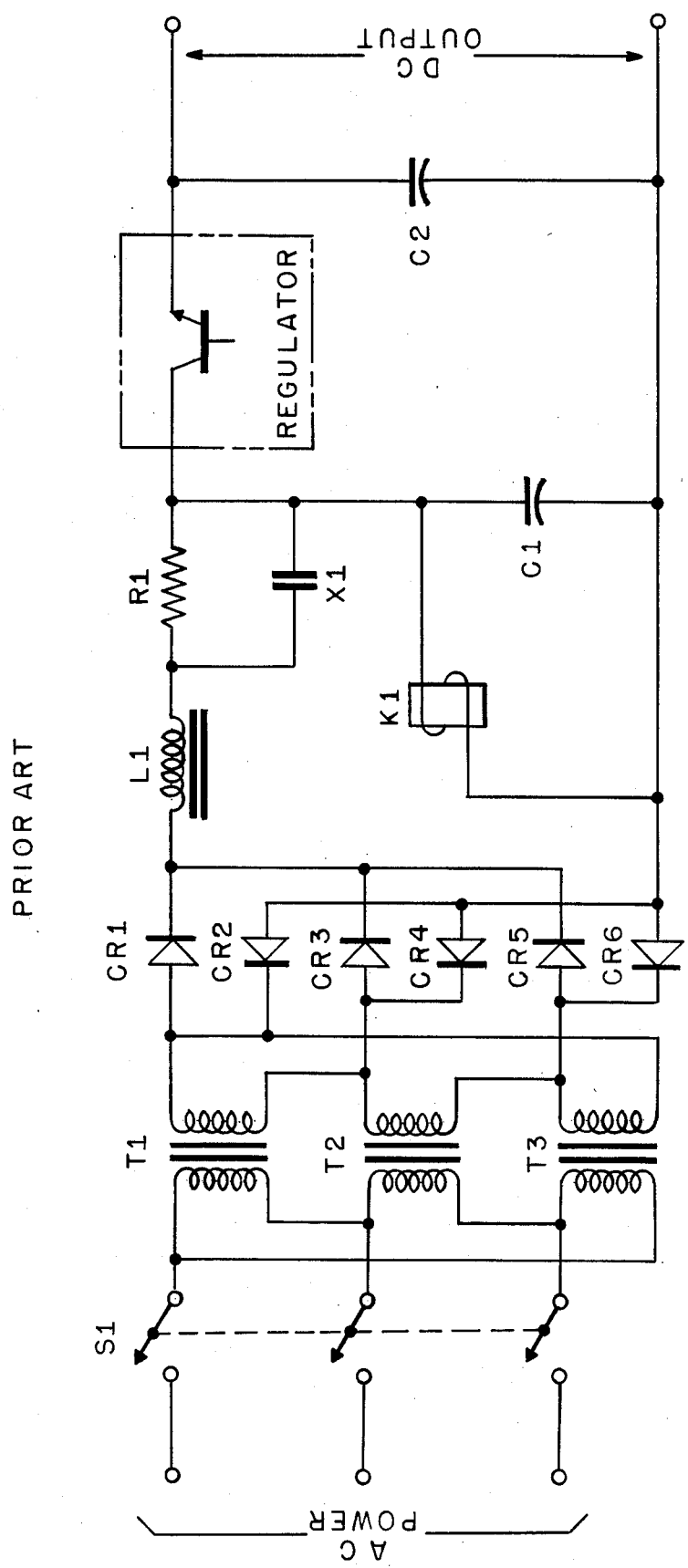
FIG. 1 is a schematic circuit diagram of a prior art relay-type surge limiter for a three-phase DC voltage power supply and a lossy type regulator circuit.
Figure 2:
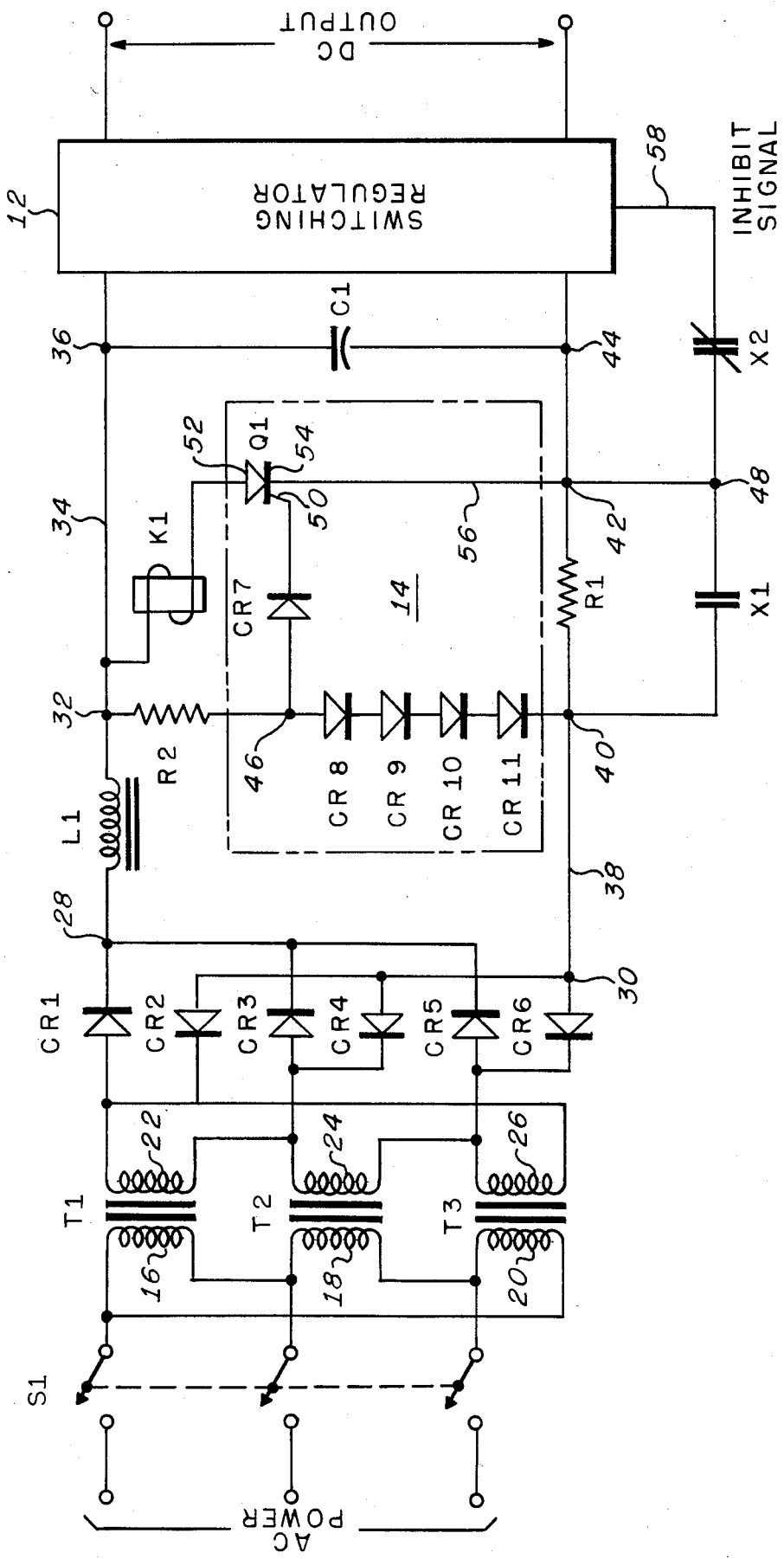
FIG. 2 is a schematic circuit diagram for a switching regulator power supply employing the inrush current limiter circuitry of the present invention.

Referring now to FIG. 2, there is shown generally a three-phase power supply circuit, a switching regulator 12, controls circuit 14, a filter network including inductance L1 and storage capacitor C1, rectifying diodes CR1, CR2, CR3, CR4, CR5, and CR6, transformer windings T1, T2, and T3, and input switch S1.

Control circuit 14 is interposed between inductor L1 and capacitive load C1. It is the basic concept of this invention that for a short period of time after applying an initial voltage to the circuit, which is referred to herein as circuit turn-on, additional input impedance is inserted in series with the capacitive load to suppress the initial inrush current to the uncharged capacitance. After the capacitor C1 has reached a predetermined condition of charge, control circuit 14 senses the voltage drop across resistor R1 and provides a trigger to silicon-controlled rectifier Q1 which energizes relay K1, whereupon the inrush current suppression resistor R1 is shunted by contacts X1 and the switching regulator 12 is enabled. In this manner, circuit impedance is minimized during steady-state current conditions.

The conventional AC-to-DC power supply, as is well known in the art, consists essentially of a plurality of transformers T1-T3 having input windings 16,18,20 coupled through a series switch S1 to a source of AC power, and respective output windings 22, 24, 26 coupled to a plurality of rectifiers CR1-CR6 arranged in a full-wave bridge circuit. While a three-phase circuit is shown in FIG. 2, the invention may be practiced with a single-phase soure of power, wherein only a single transformer and four rectifying elements are required, or with multiple phase supplies of higher order than three. The concepts of the invention described herein apply for any AC-to-DC power conversion system or, in fact, any switched electrical power input, including a DC-to-DC power system.

An AC input signal at transformers T1, T2, and T3 is rectified by the input diodes CR1-CR6 to provide unfiltered DC potential to nodes 28 and 30. Conventionally, node 28 would represent positive polarity, while node 30 would represent the negative or ground side of the circuit. A filter inductance L1 having a relatively high AC impedance at the power frequency is serially connected between node 28 and node 32. Node 32 is coupled through line 34 to node 36 and capacitor C1 and then to switching regulator 12. Node 30 is coupled on line 38 to node 40, through inrush current suppression resistor R1, which offers a relatively high impedance, in series relationship with the DC return path and through node 42 to node 44 and a ground end of capacitor C1. Node 44 further connects to the return side of switching regulator 12.

A current limiting resistor R2 is connected from node 32 through series connected diodes CR8, CR9, CR10, and CR11 at node 46. The cathode of diode CR11 is returned to ground at node 40. The anode of diode CR8 connects via node 46 to resistor R2 and to the anode of diode CR7. Node 46 provides a point of reference potential derived from the DC voltage developed across nodes 32 and 40 by virtue of the predetermined voltage drop provided by the current through diodes CR8-CR11. When triggered, control circuit 14 drives relay K1, thereby closing normally-opened contacts X1 and opening normally-closed contacts X2. The reference potential at node 46 drives diode CR7 in a manner to be described and activates silicon-controlled rectifier Q1, thereby pulling current through relay K1. Contacts X1 are arranged through nodes 40, 48, and 42 to shunt resistor R1 when closed. This permits the full DC voltage to be applied to capacitor C1 when relay K1 is activated and applies a reduced DC potential to capacitive load C1 when the relay is inactive. Contacts X2 complete a circuit to inhibit operation of switching regulator 12 when K1 is inactive, and to enable operation of regulator 12 when relay K1 is energized. The regulated DC output of switching regulator 12 is then applied to a load, not shown.

In operation, upon the closure of switch S1 a transient-free input current is desired from the AC power source. When switch S1 is initially closed, a positive DC voltage is applied to inductor L1 and a negative DC voltage to resistor R1, both impedances serially connected to capacitor C1. Therefore the current experienced during the initial charging of the uncharged C1 is limited by the series impedances of both the inductor L1 and the suppression resistor R1. Following the application of DC voltage, while capacitor C1 is charging, a reference potential is developed across diode array CR8-CR11, in a manner to be described, which potential is connected through diode CR7 to the gate 50 of silicon-controlled rectifier Q1. Resistor R2 and diodes CR8-CR11 form a voltage reference circuit. Resistor R2 is selected to provide sufficient current to establish a constant diode voltage drop across CR8-CR11, nominally 1.6-2.8 volts. A zener diode may also be used in place of diodes CR8-CR11. Diode CR7 is a blocking diode to protect the gate-cathode junction of silicon controlled rectifier Q1 against excessive reverse voltages. On the initial charging phase, most of the charging voltage is dropped across resistor R1 and is sufficient to back-bias the gate-cathode junction of SCR Q1 and diode CR7. Therefore, no current flows through the gate-cathode junction of Q1, and Q1 is in a nonconducting state. When C1 becomes substantially charged, the voltage across resistor R1 will drop below the reference voltage at point 46. Thus, when the voltage drop across resistor R1 reaches a predetermined value, current will flow through diode CR7 and the gate-cathode junction of 50 to trigger silicon controlled rectifier Q1. This will trigger SCR Q1 into a conductive state and current will flow through the anode-cathode junction 52-54. The current flow through SCR Q1 will energize relay K1. Upon relay K1 being energized, contact X1 closes, thereby shunting resistor R1, and contacts X2 open, thereby disconnecting the inhibit signal from regulator 12. Capacitor C1 then charges to the full output voltage of the power supply circuit, and the switching regulator is operative.

It is an advantage of the present invention that since the reference voltage is maintained relatively low with respect to the output voltage of the rectifier circuit, there is very little secondary transient current, since capacitive load C1 is substantially charged when relay K1 is energized. For example, referring again to FIG. 2, with a nominal DC supply voltage of approximately 150 V and a reference voltage of about 2.8 V, relay K1 would pull in when capacitor C1 is charged to about 147.2 V. In practice the diode voltage drops across CR7 and the gate-cathode junction of silicon controlled rectifier Q1 will prevent SCR Q1 from being triggered until the voltage drop across resistor R1 is approximately 1-1.4 volts below the reference voltage. Further, C1 will obtain additional charging time during the mechanical switching of relay K1 from one state to the other.

The purpose of inhibiting switching regulator 12 from operation while K1 is deenergized is to prevent the current drawn by the regulator from developing a sufficient voltage drop across resistor R1 so that silicon control rectifier Q1 is never forward biased.

Figure 3:
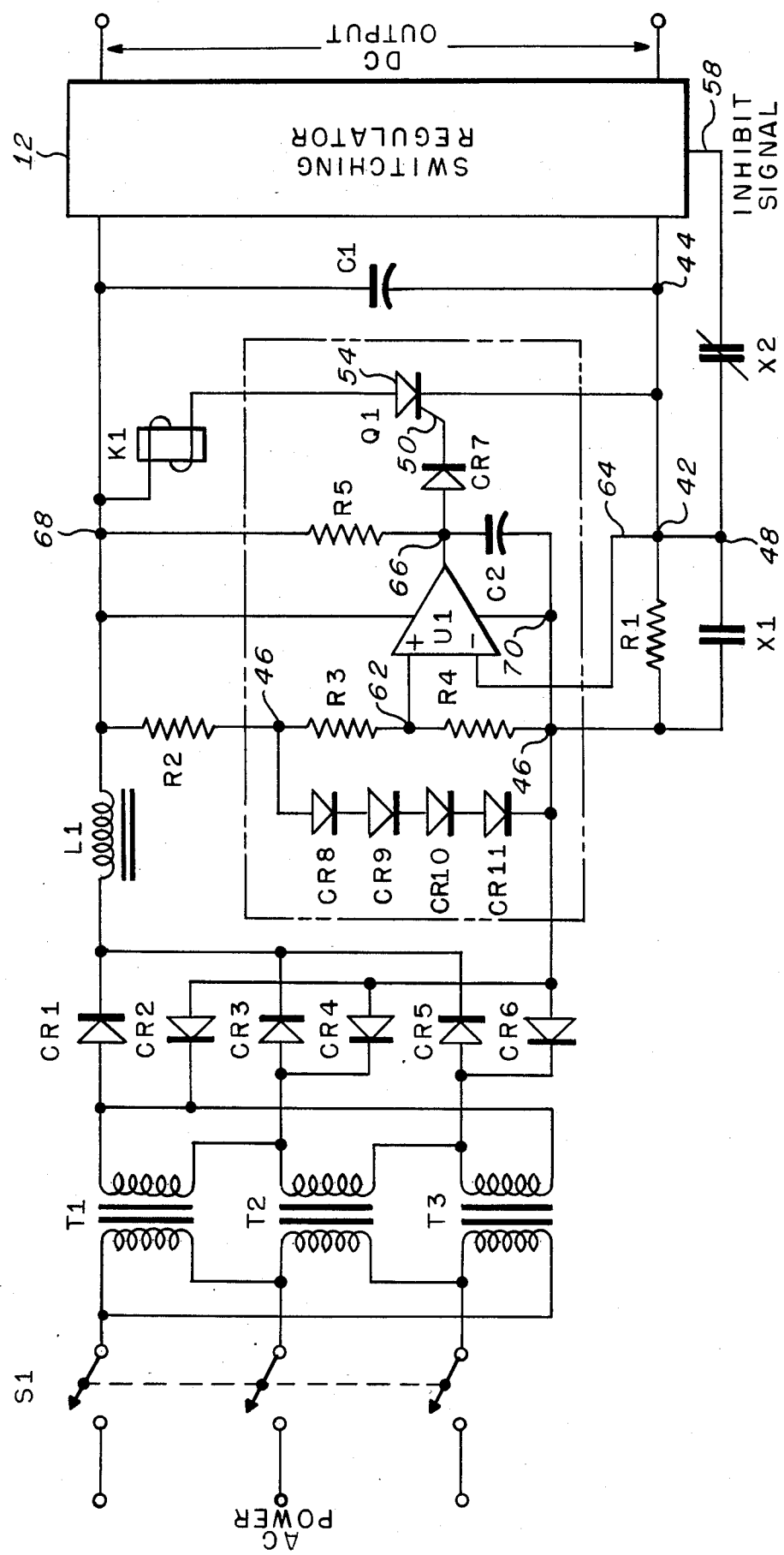
FIG. 3 is a circuit for an inrush surge limiter employing an alternate embodiment of the circuitry of the present invention.

Referring now to FIG. 3, there is shown a further aspect of the present invention applicable to low voltage power converters (i.e. 15 V or less). In the embodiment of FIG. 3 a control circuit 60 is further comprised of series resistors R3 and R4 coupled from node 46 to node 40. Junction 62 of resistors R3 and R4 is coupled to the positive input of a comparator U1. U1 may be a conventional comparator type integrated circuit logic element. The negative side of comparator U1 is coupled via lead 64 to node 42. The output of U1 is connected at node 66 to the anode of diode CR7 and to the junction of resistor R5 and by-pass capacitor C2. One end of resistor R5 is connected to the positive side of the DC supply at node 68 and the ground end of capacitor C2 is connected to the negative side of the supply at node 70.

In operation, control circuit 60 provides a means for triggering SCR Q1 at a much lower voltage level, thus permitting the capacitor C1 to charge to a voltage closer to the output voltage of the power supply before shunting resistor R1. The reference DC potential appearing at node 46 is further divided down to a lower voltage by resistors R3 and R4. This reference voltage is compared to the voltage across the inrush current suppression impedance R1 by comparator U1. Upon initial closure of power switch S1 capacitor C1 is substantially discharged and essentially the entire DC supply voltage appears across resistor R1. Since the voltage drop across resistor R1 is greater than the reference voltage appearing at node 62, U1 will be in a logic zero state and no current will flow through diode CR7. Thus, the anode of diode CR7 will be grounded and a reverse bias will be applied across diode CR7 and the gate-to-cathode junction 50-54 of silicon controlled rectifier Q1. Therefore SCR Q1 will be in a nonconductive state and relay K1 will be deenergized. As capacitor C1 continues to charge, the voltage across resistor R1 will drop, until the voltage across resistor R1 falls below the reference voltage. At that point comparitor U1 will output a logic high condition, thereby biasing diodes CR7 and SCR Q1 into conduction. Relay K1 will be energized thus shunting resistor R1 and activating switching regulator 12 by removing the inhibit signal from lead 58. Advantageously, the circuit will permit triggering with relatively low-voltage power supplies and permit the capacitive load to charge substantially fully before bypassing the inrush current suppression resistor.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A DC voltage power supply including circuitry for suppressing turn-on transients to limit inrush current to a substantially uncharged capacitive load, comprising:

a rectifier for providing a source of DC potential from a source of AC input voltage, means for providing a point of reference potential derived from said source of DC potential, means for coupling said capacitive load to said source of DC potential, DC voltage regulator means coupled in parallel relationship with said capacitive load and responsive to an inhibit signal for inhibiting or enabling operation of said regulator means, inrush current suppression means having a relatively high impedance and a main current conduction path in series relationship with said soure of DC potential and said capacitive load, wherein said impedance limits the magnitude of current supplied to said capacitive load, and control means responsive to said reference potential, said control means being coupled in parallel relationship with said capacitive load and responsive to a potential developed across said inrush current suppression means attaining a predetermined value with respect to said reference potential, whereupon said control means provides a trigger signal, said control means further comprising:

switching means having a first current path coupled in parallel with said current suppression means and a second current path coupled to activate said regulator means, said switching means being responsive to said trigger signal to provide, when activated, a low impedance shunt path across said current suppression means and to enable said regulator means, and when deactivated to disable said regulator means and apply said inrush current suppression means in said series relationship with said capacitive load.

2. The power supply as set forth in claim 1, wherein said means for providing a point of reference potential comprises a unidirectional conductive element having a predetermined voltage drop when in a conductive state.

3. The power supply as set forth in claim 2, wherein said unidirectional conductive element comprises a diode.

4. The power supply as set forth in claim 3, wherein said diode comprises a zener diode.

5. The power supply as set forth in claim 3 further comprising a plurality of series connected diodes.

6. The power supply as set forth in claim 1, said control means further comprising silicon-controlled rectifier means having anode, cathode, and gate electrodes, said rectifier means having an anode to cathode conduction path substantially in parallel relationship with said capacitive load.

7. The power supply as set forth in claim 6, said control means further comprising relay means having an energizing coil with first and second terminals, said first terminal coupled to said anode electrode of said silicon-controlled rectifier means in series relationship therewith and said second terminal coupled to said source of DC potential.

8. The power supply as set forth in claim 7 wherein said control means is further comprised of diode means coupled to receive said reference potential and when rendered conductive to apply a sufficient current to said gate electrode of said silicon-controlled rectifier means to render said silicon controlled rectifier means conductive, said rectifier means adapted for energizing said relay means when in a conductive state.

9. The power supply as set forth in claim 7 wherein said control means is further comprised of means for coupling said cathode electrode of said silicon-controlled rectifier means to said inrush current suppression means and to said capacitive load.

10. The power supply as set forth in claim 9, said relay means further comprising contact means activiated by said relay means and coupled to said DC voltage regulator means for applying said inhibit signal.

11. The power supply as set forth in claim 10, said relay means further comprising further contact means activated by said relay means and in parallel relationship with said inrush current suppression means for shunting said inrush current suppression means when said relay energizing coil is energized by current flow through said silicon-controlled rectifier means.

12. The power supply as set forth in claim 11, wherein said reference potential is further applied to a plurality of series connected resistive elements to derive a point of reduced reference potential.

13. The power supply as set forth in claim 12, said control means further comprising comparator means having a first input coupled to receive said reduced reference potential and second oppositely polarized input responsive to said potential developed across inrush current suppression means, wherein said comparator means provides a first logic condition when said developed potential exceeds said reduced reference potential, and a second logic condition when said reduced reference potential exceeds said developed potential.

14. The power supply as set forth in claim 13, wherein said first logic condition is applied to said gate electrode to energize said relay means and said regulator means when said capacitive load is substantially charged, and said second logic condition is applied to said gate electrode to deenergize said relay means and said regulator means when said capacitive load is substantially uncharged.

* * * * *